United States Patent [19]
Koshar

[11] 3,758,593
[45] Sept. 11, 1973

[54] FUNCTIONAL BIS(PERFLUOROALKYLSULFONYL)ALKYL

[75] Inventor: Robert J. Koshar, Mahtomedi Village, Minn.

[73] Assignee: Minnesota Mining and Manufacturing Company, Saint Paul, Minn.

[22] Filed: May 1, 1972

[21] Appl. No.: 248,900

Related U.S. Application Data

[62] Division of Ser. No. 807,408, March 14, 1969, Pat. No. 3,704,311.

[52] U.S. Cl........... 260/607 A, 260/567.6, 260/129, 260/448, 260/429.3, 260/583 DD
[51] Int. Cl........................................... C07c 147/02
[58] Field of Search................ 260/567.6, 129, 448, 260/429.3, 583 DD, 607 A Primary Examiner—Lewis Gotts
Assistant Examiner—D. R. Phillips
Attorney—Alexander, Temple Clayton et al.

[57] ABSTRACT

Bis(perfluoroalkanesulfonyl)substituted methanes possessing reactible groups such as halogen, hydroxyl, carboxyl or ester groups or possessing carbon-to-carbon unsaturation are provided. The residual hydrogen of the methane is relatively acidic and the compounds form metallic and organic salts which are recoverable. The molecule with acid hydrogen can be further reacted by the reactible group to incorporate an acidic hydrogen in another molecule such as a polymer. The acidic hydrogen effects absorption of basic vapors such as ammonia, amines, etc. Bis(perfluoroalkylsulfonyl) bromomethanes add to olefinic double bonds.

2 Claims, No Drawings

FUNCTIONAL BIS(PERFLUOROALKYLSULFONYL)ALKYL

This application is a division of copending application Ser. No. 807,408 filed Mar. 14, 1969, now U.S. Pat. No. 3,704,311.

This invention relates to bis(perfluoroalkanesulfonyl) methanes and particularly to such sulfones additionally containing at least one reactible group such as hydroxyl, carboxyl, ester, bromine or chlorine or including carbon-to-carbon unsaturation.

Unsubstituted bis(perfluoromethanesulfonyl)methane is known from the work of Gramstad and Haszeldine, J. Chem. Soc. 4069 (1957) and is described by Brice and Trott in U.S. Pat. No. 2,732,398. In addition, certain substituted monoperfluoromethanesulfonylmethanes were described by Yagupol'skii and co-workers in Russian publications. The various unsubstituted bis(perfluoroalkylsulfonyl) methanes are conveniently prepared by reaction of the corresponding perfluoroalkanesulfonyl fluoride with a methyl Grignard agent followed by metallation of the metyl perfluoroalkyl sulfone and reaction with more sulfonyl halide. The terms "perfluoroalkylsulfonyl" and "perfluoroalkanesulfonyl" are here used as alternatives.

The novel compounds of the invention are members of the group consisting of: $(R_fSO_2)_2CMCH_2CHBr(CH_2)_mY$; $(R_fSO_2)_2CM(C_nH_2 09)OR$ and $(R_fSO_2)_2CMW$ wherein M is H or ammonium, organic quaternary ammonium or 1-4-valent inorganic metallic ions, $R_f$ is perfluoroalkyl of one to about 18 carbon atoms, Y is H, Br, Cl, OR, $CO_2R'$; R is H, unsubstituted saturated acyl up to seven carbon atoms or unsubstituted unsaturated acyl of three to four carbon atoms and R' is H or unsubstituted alkyl up to eight carbon atoms, W is Cl, Br, alkenyl of 3–4 carbon atoms or $\{CH_2CH(X)O\}_pH$; X being H or $CH_3$ and $p=1-10$; $(C_nH_2)$ being divalent and having not more than three carbon atoms separating valences, and $n=1-6$ and $m=1-8$.

It will be recognized that when M is H the compounds are the acids and that the salts are compounds in which the acidic hydrogen has been replaced by an inorganic metallic cation or by an organic quaternary ammonium ion or was combined with a simple nitrogenous base to an ammonium or mono- di- or tri- substituted ammonium ion. Those skilled in the art will readily recognize that any amine having a degree of basicity will form salts. Metallic cations may most easily be introduced by uses of carbonates, oxides, hydroxides or by disproportionation with salts of volatile organic acids.

From the one stand-point these novel compounds may be considered as substituted bis(perfluoroalkylsulfonyl) methanes and salts thereof and from another as alkyl halides, alcohols, carboxylic acids and esters which provide protons with exceptional ease or the salts thereof. Thus, the acids absorb basic gases or vapors and polymers thereof may be used to exchange for cations. The salts are often converted to acids by heating and undergo disproportionation reactions. Salts in which $R_f$ is relatively small tend to be water-soluble and as $R_f$ increases surface activity increases.

The acidic disulfones of the invention are generally high boiling non-hygroscopic liquids, b.p. above 200° C., or solids having no appreciable or very low vapor pressure at or near room temperature. They form stable metal and organic salts which may precipitate metathetically or may be recovered by evaporation of a solution. These salts are particularly useful for regeneration of the acidic sulfone by heat, e.g., they may be used as catalysts. In such conditions they exhibit some latency. The acids are also liberated by treatment of the salts with stronger acids, such as $CF_3SO_3H$, HCl or $H_2SO_4$.

Metal salts are obtained with metals with valencies from 1 through 4, including alkali metal, e.g., potassium, sodium and alkaline-earth metal salts e.g., calcium, strontium, as well as zirconium, iron, aluminum, copper, magnesium, nickel, zinc, lead and silver. Surprisingly such salts, including the silver salt are formed by the bromo and chloro disulfones in which W is Br or Cl. The preferred salts are those with 1-2-valent cations, ammonium and substituted ammonium.

Organic salts are obtained from organic nitrogeneous bases having a pKa of greater than about 1.5. Examples of amines which form salts with the disulfones include pyridine, aniline, n-butylamine, 2-chloroaniline, cyclohexylamine, diethanolamine, diethylamine, methylamine, N-ethylaniline, piperidine, α-picoline, triethylamine, morpholine, guanidine, and aminoguanidine. More acidic disulfones also form salts from less basic amines such as diphenylamine (pKa=0.85). Salts such as the ammonium salt are prepared by reaction with ammonia. Quaternary ammonium hydroxides react to yield salts.

Certain of the present compounds are prepared by formation of the organo-metallic halide from unsubstituted bis(perfluoroalkanesulfonyl)methane followed by reaction with a suitable organic compound. The unsubstituted methanes known in the art bear two like alkyl sulfonyl groups. Others bearing two unlike groups are prepared using different sulfonyl fluorides for preparing the methyl sulfone and for reaction with the metal complex thereof in the above outlined synthesis.

An organo metallic halide of the bis(perfluoroalkylsulfonyl)methane is most conveniently prepared by reaction of the unsubstituted bis sulfonyl methane with a simple methyl Grignard reagent, e.g. $CH_3MgCl$ or $CH_3MgBr$ in a solvent such as anhydrous diethyl ether or tetrahydrofuran. Methane is formed as a by-product and a magnesio-organic derivative is obtained. Reactions are found to proceed in much the same way as conventional Grignard reactions by reaction with halogen or alkyl or alkenyl halides or with an oxirane or with formaldehyde. Compounds prepared by this method are intermediates for further reactions to form other unsubstituted bis(perfluoroalkylsulfonyl)methanes by esterification of OH or $CO_2H$ groups, oxidation, reduction or by addition reactions making necessary allowances for the acidity of the compounds.

Another procedure for preparing certain compounds of the invention involves an addition to a double bond of a bis(perfluoroalkylsulfonyl) bromomethane which may be formed by bromination as described hereinbelow.

EXAMPLE 1

A dry, 250 ml. three-necked flask, fitted with stirrer, condenser and dropping funnel and gas measuring assembly is charged with 25 g. (0.03 mole) of bis(perfluorooctylsulfonyl)-methane, $(C_8F_{17}SO_2)_2CH_2$, and 125 ml. of tetrahydrofuran (distilled from $LiAlH_4$). To the stirred mixture at room temperature is added 14 ml. of 3.0 molar methylmagnesium chloride (0.04 mole) in tetrahydrofuran. A clear solution results and 1150 ml. of gas (methane) is collected. After stirring at room temperature for one hour, 5.1 g. (0.04 mole) of allyl bromide is added. The mixture is stirred at 60° C. for one hour further, cooled to 0° C. and hydrolyzed by the slow addition of 25 ml. of 3N HCl followed by the addition of 250 ml. of water. The upper layer is decanted and lower layer diluted with 250 ml. of water. Filtration yields crude product which is first recrystallized from chloroform and then slurried with 1,1,2-trichloro-1,2,2,-trifluoroethane at room temperature and the mixture filtered. Evaporation of the filtrate yields 8.7 g. of 4,4-bis(perfluorooctylsulfonyl)butene-1, $(C_8F_{17}SO_2)_2$—$CHCH_2CH=CH_2$, m.p. 85°–86.5° C.

The compound is characterized by elemental analysis as well as by infrared and nuclear magnetic resonance (n.m.r.) spectroscopy.

Analysis: Calculated for $C_{20}H_6F_{34}O_4S_2$: C, 23.7%; H, 0.6%; F, 63.3%: Found: C, 23.4%; H, 0.8%; F, 62.6%.

EXAMPLE 2

The procedure of Example 1, is repeated using a stirred solution of 25 g. (0.09 mole) of bis(perfluoromethylsulfonyl) methane, $(CF_3SO_2)_2CH_2$, in 125 ml. of dry tetrahydrofuran at room temperature to which is added 50 ml. of 3.0 molar methylmagnesium chloride (0.15 mole) in tetrahydrofuran. Stirring is continued for one hour and then 18.2 g. (0.15 mole) of allyl bromide is added. After stirring at 60° C. for one hour further and remaining at room temperature for 15 hours, the mixture is hydrolyzed by the addition of 35 ml. of a saturated aqueous ammonium chloride solution and 50 ml. of diethyl ether is added. The organic phase is separated and filtered and the solids washed with diethyl ether. Distillation of the filtrate gives 85 g. of a liquid residue. The residue is dissolved in water, acidified with 3N hydrochloric acid and extracted with diethyl ether. Distillation of the extract (dried over $MgSO_4$) gives 16.7 g. of 4,4-bis(perfluoromethylsulfonyl)butene-1, $(CF_3SO_2)_2CHCH_2CH=CH_2$, b.p. 101° C. (23 mm.).

The compound is identified by proton nuclear magnetic reasonance spectroscopy, infrared spectroscopy and elemental analysis. The infrared spectrum exhibits a weak $>C=C<$ absorption at about 6.05 $\mu$.

Analysis: Calculated for $C_6H_6F_6O_4S_2$: C, 22.5%; H, 1.9%; F, 35.6%; Found: C, 21.7%; H, 1.7%; F, 36.1%.

Other homologous haloalkenyl compounds, e.g., crotyl or isocrotyl bromide, may be reacted in a similar fashion as will be evident to those skilled in the art. The double bonds in the products may be oxidized to acids and also undergo other typical reactions of double bonds.

EXAMPLE 3

3,3-Bis(perfluoromethylsulfonyl)propan-1-ol is prepared by the reaction of ethylene oxide (4.8 g.; 0.11 mole) with the magnesium bromide complex $(CF_3SO_2)_2CHMgBr$ prepared in a dry 250 ml. flask, (fitted with a stirrer, water condenser and dropping funnel) from 10 g. (0.036 mole) of $(CF_3SO_2)_2CH_2$ in 100 ml. of anhydrous tetrahydrofuran and about 16 ml. of a 3.29 molar solution of methylmagnesium bromide (0.05 mole) in diethyl ether. The reaction mixture is stirred at room temperature for 1.5 hours and hydrolyzed with 100 ml. of 3N HCl. Extraction with diethyl ether followed by distillation of the extract (dried over $MgSO_4$) yields 1.6 g. of $(CF_3SO_2)_2CHCH_2CH_2OH$, b.p. 112° C. (4.5 mm.). The compound is characterized by its infrared and proton n.m.r. spectra. The n.m.r. spectrum exhibited absorptions ($\tau$) at 4.50 (CH; triplet), 6.08 (—$CH_2CH_2OH$; triplet), 7.30 (—$CH_2CH_2OH$; quadruplet) and 7.60 (OH).

When formaldehyde vapors are employed in place of ethylene oxide the product is 2,2-bis(perfluoromethylsulfonyl) ethanol. When trimethylene oxide (oxetane) is used the product is 4,4-bis(perfluoromethylsulfonyl)-butanol-1. Other epoxy compounds which are used include propylene and isobutylene oxide, epichlorhydrin and 2,3-epoxypentane.

EXAMPLE 4

Using the above procedure of Example 3, 3,3-bis(perfluorobutylsulfonyl)propan-1-ol is prepared from 21.5 g. (0.04 mole) of bis(perfluorobutylsulfonyl)methane, $(C_4F_9SO_2)_2CH_2$, in 125 ml. of anhydrous tetrahydrofuran.

Recrystallization of crude product from carbon tetrachloride gives $(C_4F_9SO_2)_2CHCH_2CH_2OH$, m.p. 58°–60° C.

Analysis: Calculated for $C_{11}H_6F_{18}O_5S_2$: C, 21.2%; H, 1.0%; F, 54.8%; Found: C, 21.0%; H, 1.0%; F, 55.0%.

EXAMPLE 5

Using the procedure of Example 2, bis(perfluoromethylsulfonyl)bromomethane is prepared by adding bromine (24 g.; 0.15 mole) to a stirred tetrahydrofuran solution at room temperature of $(CF_3SO_2)_2CHMgCl$ (from 25 g. (0.09 mole) of bis(perfluoromethylsulfonyl)methane and methylmagnesium chloride as in Example 2). The mixture is stirred at room temperature for 1.5 hours and at 60° C. for one hour, hydrolyzed with 75 ml. of 3N HCl and the tetrahydrofuran phase separated and the tetrahydrofuran evaporated under reduced pressure. The residue is washed with water and dissolved in diethyl ether. Distillation of the ethereal solution (dried over $MgSO_4$) gives 26.5 g. of $(CF_3SO_2)_2CHBr$, b.p. 93°–95° (9 mm.). The proton n.m.r. spectrum exhibits a strong singlet at 3.75 $\tau$ characterizing the single hydrogen atom.

EXAMPLE 6

This example illustrates the preparation of the unsymmetrical sulfone, $C_8F_{17}SO_2CH_2SO_2CF_3$.

To a dry stirred solution of 16 g. (0.11 mole) of methyl perfluoromethyl sulfone and 75 ml. of dry tetrahydrofuran at about 10° C. and under nitrogen is gradually added 40 ml. of 3.0 molar solution of methylmagnesium chloride in tetrahydrofuran (methane evolved). The mixture is allowed to warm to room temperature and 55.2 g. of perfluorooctanesulfonyl fluoride is added. The mixture is stirred at room temperature for two hours and then under reflux for one hour. After hydrolysis of the mixture with 75 ml. of 3N hydrochloric acid, three phases result. The upper organic phase is separated and evaporated under reduced pressure to yield 28 g. of solid residue. The solid is slurried with 10 percent aqueous sodium bicarbonate solution, the aqueous phase acidified and then extracted with diethyl ether. Evaporation of the ethereal solution yields 22 g. of $C_8F_{17}SO_2CH_2SO_2CF_3$ which is recrystallized from carbon tetrachloride, m.p. 106°–108° C.

Analysis: Calculated for $C_{10}H_2F_{20}O_4S_2$: C, 19.2%; H, 0.3%; F, 60.3%; Found: C, 18.8%; H, 0.3%; F, 59.9%.

By reaction with an excess of ethylene oxide and propylene oxide using the general procedure of Example 3 (and of Example 14 below) substituted alcohols are prepared having structures $(C_8F_{17}SO_2)(CF_3SO_2)CH(CH_2CH_2O)_nH$ and

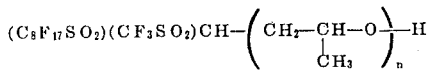

where $n$ is from 1 to about 8.

EXAMPLE 7

Bis(perfluoromethylsulfonyl)bromomethane is prepared by bromination of the mono-potassium salt of bis(perfluoromethylsulfonyl)methane. A solution of 48.2 g. (0.17 mole) of bis(perfluoromethylsulfonyl)methane and 225 ml. of anhydrous methanol is neturalized with 13.1 g. (0.09 mole) of potassium carbonate. The mixture is filtered and the filtrate evaporated to dryness. The salt is dried, suspended in 225 ml. of carbon tetrachloride and 27.6 g. (0.173 mole) of bromine in 30 ml. of carbon tetrachloride is added. The mixture is stirred at room temperature for one hour and under reflux for 1.5 hours. The mixture is filtered and the filtrate distilled to yield 56.5 g. of $(CF_3SO_2)_2CHBr$, b.p. 93°–94.5° C. (9 mm.).

Analysis: Calculated for $C_3HBrF_6O_4S_2$: C, 10.0%; Br, 22.3%; F, 31.7%; Found: C, 9.9%; Br, 22.4%; F, 31.5%.

EXAMPLE 8

To a suspension of 25 g. (0.08 mole) of the potassium salt of bis(perfluoromethylsulfonyl)methane prepared as described in Example 7 is added 5.5 g. (0.08 mole) of chlorine. The mixture is stirred at room temperature for about two hours and then filtered. Distillation of the filtrate yields, bis(perfluoromethylsulfonyl)chloromethane $(CF_3SO_2)_2CHCl$, b.p. 84°–86° C. (18 mm.).

Analysis: Calculated for $C_3HClF_6O_4S_2$: C, 11.5%; Cl, 11.3%; H, 0.3%; Found: C, 11.2%; Cl, 13.2%; H, 0.2%.

EXAMPLE 9

Using the procedure described in Example 7, bromination of the potassium salt of bis(perfluorobutylsulfonyl)methane yields bis(perfluorobutylsulfonyl)bromomethane $(C_4F_9SO_2)_2CHBr$ which is purified by recrystallization from heptane, m.p. 61.5°–62.5° C.

Analysis: Calculated for $C_9HBrF_{18}O_4S_2$: C, 16.4% F, 52.0%; Br, 12.1%; Found: 16.5%; F, 52.3%; Br, 11.3%.

Other disulfones which are prepared by procedures described in Examples 7–9 include $C_8F_{17}SO_2CHClSO_2CF_3$, $(C_8F_{17}SO_2)_2CHCl$, $(C_8F_{17}SO_2)_2CHBr$, $C_4F_9SO_2CHBrSO_2CF_3$ and $C_8F_{17}SO_2CHBrSO_2C_4F_9$. Compounds of the type $(R_fSO_2)_2CHBr$ add to terminal double bonds as shown in the following examples.

Other compounds of the invention are made by addition of bis(perfluoroalkylsulfonyl)bromomethanes (prepared as above) to α, β-unsaturated compounds $Y(CH_2)_mCH=CH_2$ which may aliphatic hydrocarbon or may contain other substituted groups such as carboxyl, carboalkoxy, acyloxy, etc. This leads to the series of compounds which include a β-halogen atom.

Further compounds of the invention are formed from the above compounds by reactions of halogen atoms or by esterification of hydroxyl or carboxyl groups. For example, hydroxyl is converted to an ester such as the methacrylate which is polymerized to a homopolymer.

EXAMPLE 10

A quartz flask, equipped with a condenser and magnetic stirring bar, is charged with 10 g. (0.04 mole) of bis(perfluoromethylsulfonyl)bromomethane, 6 ml. of methylene chloride and 3.6 g. (0.04 mole) of 4-chlorobutene-1. The mixture is stirred for four hours at ambient temperature under the illumination of a 140 watt Hanovia ultraviolet lamp, allowed to remain at room temperature for 15 hours and is then distilled to yield 6.3 g. of the adduct, 1,1-bis(perfluoromethanesfulonyl)-3-bromo-5-chloropentane $(CF_3SO_2)_2CHCH_2CHBrCH_2CH_2Cl$, b.p. 93°–94° C., at 0.05 mm. Hg.

Analysis: Calculated for $C_7H_8F_6BrClO_4S_2$: C, 18.7%; F, 25.3%; H, 1.8%; Found: C, 18.7%; F, 25.4%; H, 1.9%.

EXAMPLE 11

A quartz bulb is charged under nitrogen with 10 g. (0.04 mole) of bis(perfluoromethylsulfonyl)bromomethane and 3.5 g. (0.03 mole) of freshly distilled octene-1 (exothermic reaction). The bulb is closed and stirred at room temperature for 15 hours under ordinary light. Distillation yields the adduct, $(CF_3SO_2)_2CHCH_2CHBr(CH_2)_5CH_3$, b.p. 97°–97.5° C. at 0.1 mm. Hg.

Analysis: Calculated for $C_{11}H_{17}F_6BrO_4S_2$: C, 28.0%; F, 24.2%; Br, 17.0%; Found: C, 28.9%; F, 24.2%; Br, 16.2%.

EXAMPLE 12

Using the procedure of Example 10, a mixture of 10 g. (0.04 mole) of bis(perfluoromethylsulfonyl)bromomethane, 6 ml. of methylene chloride and 3.5 g. (0.04 mole) of 3-butenoic acid is illuminated for 6 hours. A white solid precipitates. Filtration gives 6.0 g. of the adduct, $(CF_3SO_2)_2CHCH_2CHBrCH_2CO_2H$, which is recrystallized from chloroform, m.p. 147°–148° C.

Analysis: Calculated for $C_7H_7BrF_6O_6S_2$: C, 18.9%; F, 25.6%; H, 1.6%; Found: C, 19.1%; F, 25.7%; H, 1.8%.

The acid is converted to esters by reaction with alcohols in the presence of a suitable acidic catalyst.

Adducts of $(CF_3SO_2)_2CHBr$ are prepared by analogous reactions with other terminally unsaturated olefins such as propene, butene-1, pentene-1, undecylenic acid and its esters, undecenyl bromide, undecenyl alcohol $(CH_2=CH(CH_2)_9OH$ and esters thereof), and like compounds.

The higher bis(perfluoroalkylsulfonyl)bromomethanes in which alkyl is ethyl, octyl, etc. are also used as addends with the above described olefins and yield compounds of the invention.

EXAMPLE 13

A 50 ml. flask equipped with a magnetic stirring bar, condenser and Barrett water receiver is charged with 6.2 g. of 3,3-bis(perfluorobutylsulfonyl)propan-1-ol from Example 4, 15 ml. of benzene and 0.002 g. of phenothiazine. The mixture is heated to dissolve the disulfone and 1.0 g. (0.014 mole) of acrylic acid is added followed by 0.06 g. of concentrated sulfuric acid. The mixture is stirred under reflux for 20 hours and water continuously removed. The mixture is evaporated under reduced pressure and the residue dissolved in hot heptane. Cooling of the heptane solution to about 0° C. gives 2.6 g. of insoluble, moderately viscous liquid which is mainly 3,3-bis(perfluorobutylsulfonyl)-propyl acrylate

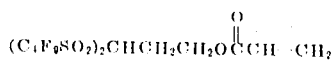

A mixture of 0.7 g. of the above acrylate monomer, 2.0 g. of benzotrifluoride and 0.003 g. of benzoyl peroxide is sealed in vacuo in a Pyrex ampoule and heated at 50° C. for 20 hours. Evaporation of the solvent followed by extraction of the residue with warm heptane yields about 0.5 g. of poly[3,3-bis(perfluorobutylsulfonyl)propyl acrylate]. Elastomeric films of the polymer are cast from benzotrifluoride solution. This appears to contain from 2 and more up to a few hundred e.g. 300 monomer units.

Using the above procedures the methacrylate monomer,

and its homopolymer are prepared.

EXAMPLE 14

Propylene oxide (1.7 g.; 0.03 mole) in 10 ml. of dry tetrahydrofuran is slowly added to a stirred mixture of 7.0 g. (0.03 mole) of bis(perfluoromethylsulfonyl)methane and 20 ml. of tetrahydrofuran. The reaction is immediately exothermic and the addition is controlled so that the temperature does not exceed 30° C. The mixture is refluxed for one hour and distilled to yield 5.9 g. of unreacted disulfone and 2.1 g. of a viscous liquid which does not distill at 160° C. (0.1 mm.). The residue containing $(CF_3SO_2)_2CH[CH_2CH(CH_3)O]_n-H$ has a fluorine content of about 12.5% and an average molecular weight of 666. The value of $n$ in the formula is about 7.

A similar compound is made using ethylene oxide.

EXAMPLE 15

The disulfones of the invention are useful as catalysts for polymerization of cationic-sensitive monomers, e.g., epoxides.

Bis(perfluoromethylsulfonyl)chloromethane (Example 8) (0.05 g.) is dissolved in methylene chloride and added with stirring to 3.0 g. of 3,4-epoxycyclohexylmethyl-3,4-epoxy-cyclohexane carboxylate (Union Carbide ERL-4221 epoxy monomer) at room temperature. After about 0.1 minute a hard brittle polymer is obtained. Similarly, $(C_8F_{17}SO_2)_2CHCH_2CH=CH_2$ is used with the above epoxy monomer and after mixing at 115° C. for 3 minutes a hard brittle polymer is obtained. The properties of the polymer depend upon the monomer rather than on the particular catalyst used. Other monomers are polymerized by similar procedures using compounds of the invention.

The following examples show the use of the disulfones of the invention as agents for removal of gaseous basic contaminants, such as ammonia or amines, from gas mixtures. In addition to solid supports which are described, inert solvents such as methylene chloride, carbon tetrachloride, glyme, chloroform and tetrahydrofuran are used in suitable bubbling tubes.

The non-polymeric disulfones, especially when $R_f$ is $CF_3$, exhibit high solubility in inert solvents such as those immediately above and the solutions are useful in analytical work for the titration of moisture-sensitive bases.

EXAMPLE 16

To a stirred mixture of 100 ml. of methylene chloride and 11 g. of calcined diatomaceous earth aggregate (chromasorb P, 30/40 mesh), which is essentially non-reactive toward amines and is used as an inert support, is added 3.0 g. (about 0.0095 mole) of the disulfone, $(CF_3SO_2)_2CHCl$. Evaporation of the solvent under reduced pressure yields a free flowing solid containing about 22 percent by weight of the disulfone.

A dry U-shaped tube is packed with 11 g. of the above solid and about 0.01 mole of anhydrous dimethylamine, diluted with nitrogen, is allowed to pass through the solid at ambient temperature. The tube becomes warm during the process indicating reaction and absorption of the amine. The absorbent is essentially fully saturated with amine.

EXAMPLE 17

Using the procedures described above in Example 16, about 12 g. of diatomaceous earth aggregate containing 19 percent by weight of the disulfone, $(CF_3SO_2)_2CHCH_2CH=CH_2$, is prepared. Passage of excess anhydrous ammonia through a tube packed with this solid results in the absorption of at least 0.008 mole of ammonia.

Other disulfones of the invention show similar absorptive ability. Low concentrations of base at low rates of flow absorbed essentially quantitatively. Excessive amount of base and high rates of flow decrease the efficiency.

EXAMPLE 18

The following examples illustrate the formation of salts of the disulfones of the invention.

A solution of 2 g. (0.006 mole) of $(CF_3SO_2)_2CHBr$ in absolute methanol is neutralized with 0.3 g. of anhydrous sodium carbonate. The mixture is filtered and the filtrate evaporated to dryness. The solid product is slurried with carbon tetrachloride to remove any unreacted disulfone, azeotropically dried with benzene under reduced pressure and the residue dried in vacuo at 90° C. There is obtained 1.5 g. of $(CF_3SO_2)_2C^-BrNa^+$, m.p. (dec.) 254°–256° C.

Analysis: Calculated for $C_3BrF_6O_4S_2Na$: C, 9.5%; Br, 21.0%; F, 29.9%; Na, 6.0%; Found: C, 9.7%; Br, 20.9%; F, 29.8%; Na, 5.8%.

EXAMPLE 19

Using procedures similar to those described above, the potassium, zinc, calcium, silver and cupric salts of $(CF_3SO_2)_2CHBr$ are prepared by neutralization with the corresponding carbonate, oxide or hydroxide. The appearances and melting points (usually with decomposition) of the salts are as follows: potassium (white; m.p., dec. is 240°–245° C.), zinc (white; m.p., dec. above 250° C.), calcium (white; m.p., dec. above 250° C.), silver (white, soluble in methanol and light sensitive; m.p. dec. 160° C.), cupric (green; m.p. dec., above 250° C.). The fact that the silver salt does not readily deposit silver bromide spontaneously is noteworthy. Alkoxides, e.g., NaOMe, Al(i—PrO)$_3$, etc. are also used to form salts with acidic disulfones.

EXAMPLE 20

To a stirred solution of 5.0 g. (0.014 mole) of $(CF_3SO_2)_2CHBr$ and 25 ml. of benzene is added 2.0 g. (0.19 mole) of triethylamine. The mixture is stirred at 60°–70° for four hours; two liquid phases result. The lower phase is separated and slurried with dry diethyl ether to yield 5.3 g. of insoluble oil which is mainly the salt, $(CF_3SO_2)_2C^-BrHN^+(C_2H_5)_3$. The salt is soluble in hot water and chloroform.

EXAMPLE 21

A solution of 1.0 g. of $(CF_3SO_2)_2CHCl$ in 20 ml. of diethyl ether is neutralized with about 0.5 g. of 2-chloroaniline (pKa=2.65). The solution is evaporated and the residue slurried with cold carbon tetrachloride yielding 0.6 g. of insoluble salt. m.p. 120°–123° C.

Under similar conditions the 2-chloroaniline salt of $(CF_3SO_2)_2CHCH_2CH=CH_2$ is prepared. This salt, m.p. 57°–60° C., is very soluble in diethyl ether, and partially soluble in carbon tetrachloride. Salts with other organic bases and quaternary ammonium hydroxides are prepared in similar ways.

The above salts as well as other organic salts of the described disulfones are identified readily by infrared spectroscopy because the salts usually exhibit $SO_2$ absorption at about 7.5 microns compared to the starting acidic disulfones which generally exhibit absorption for $SO_2$ at 7.2–7.25 microns. Other prominant absorptions for the salts occur between 9.5–10.5 microns.

The surfactant properties of certain of the above salts are particularly evident for perfluoroalkyl groups of four or more carbons. A 0.1 percent solution of $(CF_3SO_2)_2CBrK$ has a surface tension at 25° of 73 dynes/cm. as compared to distilled water which is 76 dynes/cm. At the same temperature, 0.01 solutions of $(C_4F_9SO_2)_2CBrK$ and $(C_8F_{17}SO_2)_2C^-CH_2CH=CH_2Na^+$ have values of 49 and 26 dynes/cm. respectively.

What is claimed is:

1. A compound selected from the group of substituted bis(perfluoroalkylsulfonyl)methanes consisting of $(R_fSO_2)_2CMR$ wherein:

R is alkenyl of three to four carbon atoms, $R_f$ is perfluoroalkyl of one to about 18 carbon atoms, M is H or cations of ammonium, organic quaternary ammonium or 1-4-valent inorganic metallic ions.

2. A compound according to claim 1 selected from the group of substituted bis(perfluoroalkylsulfonyl)methanes consisting of $(R_fSO_2)_2CHR$ wherein R is alkenyl of three to four carbon atoms and $R_f$ is perfluoroalkyl of one to about 18 carbon atoms.

* * * * *

UNITED STATES PATENT OFFICE
CERTIFICATE OF CORRECTION

Patent No. 3,758,593                 Dated September 11, 1973

Inventor(s) Robert J. Koshar

It is certified that error appears in the above-identified patent and that said Letters Patent are hereby corrected as shown below:

Title page, "Alexander, Temple Clayton et al." should read --Alexander, Sell, Steldt and DeLaHunt--.
Column 1, line 21 "metyl" should read --methyl--.
Column 1, lines 27-28 "$(C_nH_2O9)$" should read --$(C_nH_{2n})$--.
Column 1, line 37 "$(C_nH_2)$" should read --$(C_nH_{2n})$--.
Column 5, line 59 the word --be-- is omitted.

Signed and sealed this 25th day of December 1973.

(SEAL)
Attest:

EDWARD M. FLETCHER, JR.
Attesting Officer

RENE D. TEGTMEYER
Acting Commissioner of Patents